United States Patent
Weber et al.

(10) Patent No.: US 7,853,868 B2
(45) Date of Patent: Dec. 14, 2010

(54) BUTTON FOR ADDING A NEW TABBED SHEET

(75) Inventors: Brandon G. Weber, Redmond, WA (US); David F. Gainer, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1308 days.

(21) Appl. No.: 11/219,209

(22) Filed: Sep. 2, 2005

(65) Prior Publication Data

US 2007/0055945 A1    Mar. 8, 2007

(51) Int. Cl.
*G06F 17/00* (2006.01)
(52) U.S. Cl. .................................. 715/212; 715/273
(58) Field of Classification Search ............... 715/212, 715/214, 215, 217, 220, 273, 256, 243, 244
See application file for complete search history.

(56) References Cited

U.S. PATENT DOCUMENTS

| 1,135,993 A1* | 5/2005 | Yolleck et al. ............. 715/777 |
| 7,467,350 B2* | 12/2008 | Aureglia et al. ............ 715/218 |
| 2004/0018506 A1* | 1/2004 | Koehler et al. ............... 435/6 |
| 2006/0095833 A1* | 5/2006 | Orchard et al. ............ 715/503 |

OTHER PUBLICATIONS

Excel 2002 for Dummies. Harvey, Greg., 2001, Hungry Minds, Inc., p. 246.*
Person, Ron.; Special Edition: Using Microsoft Excel; Dec. 17, 1996.*
Weverka, Peter; Microsoft Office OneNote 2003 Step by Step; Jul. 13, 2004.*
Microsoft Office OneNote "Introducing Microsoft Office OneNote 2003" http://office.microsoft.com/en-us/onenote/HA011221851033.aspx; 2003.
Microsoft Office OneNote "OneNote quick start guide" http://office.microsoft.com/en-us/help/HA011208811033.aspx; 2003.
Microsoft Office OneNote Screenshot (annotated to illustrate "new page" button) (admitted prior art).

* cited by examiner

*Primary Examiner*—Laurie Ries
(74) *Attorney, Agent, or Firm*—Merchant & Gould P.C.

(57) ABSTRACT

A "new sheet button" is provided in a program, such as a spreadsheet, that utilizes a collection of tabbed sheets or a "workbook." The new sheet button is located adjacent the sheet tabs so that a user may add a new sheet to the workbook with a single button press. The new sheet may be added to the end of the workbook or immediately adjacent an active sheet within the workbook, among other options. Selecting the new sheet button with a default operation (such as a left mouse click) adds a blank sheet to the workbook. Selecting the new sheet button with a non-default activation (such as a right-click) generates a menu listing options for creating the new sheet, such as copying the contents of the active sheet.

11 Claims, 6 Drawing Sheets

BUTTON FOR ADDING A NEW TABBED SHEET

BACKGROUND

Common software applications such as spreadsheets use tabs to label separate "sheets" and allow the user to navigate between sheets in a set of sheets, or "workbook." A workbook, as used herein, refers to any set of tabbed elements, while a sheet refers to a tabbed element. Indeed, many non-spreadsheet applications also use the concept of tabs to aid users in accessing and organizing data.

Typically, applications require three steps to add a new sheet: (1) selecting the sheet before which the new sheet will be added; (2) selecting an "Insert" menu (e.g., from the menu bar at the top of the application screen or from within a right-click context menu); and (3) selecting "new sheet" from the Insert menu. Once the new sheet has been created, a user may move the new sheet to a desired location, such as the end of the existing list of sheet tabs, by using a drag-and-drop technique. This sequence of steps may be inconvenient for experienced users that frequently need to add new sheets to existing workbooks, and may be difficult or non-intuitive for new users.

SUMMARY

The present invention is generally related to allowing the user to add a new sheet to a set of sheets or "workbook" by pressing a single button. The "new sheet button" is located adjacent the other sheet tabs so that a user may easily locate and activate the button. In one embodiment, the new sheet is added to the end of the workbook so that the tab for the new sheet is positioned at one end of the sheet tabs. This is not only a commonly desired location for the new sheet (i.e., at the end of the workbook), but also leaves the new sheet tab in a location near the cursor where it can be easily accessed and/or moved. Alternatively, the new sheet may be added immediately before or after an active sheet within the workbook since a user may desire to add the sheet as close as possible to the active sheet where the user is working.

In an embodiment, a new blank sheet may be added in response to a default activation (e.g., a left mouse button click) of the new sheet button. Alternatively, a non-default activation (such as a right-click) of the button may be used to generate a pop-up menu listing a number of options for creating the new sheet. These options may include copying the contents of the active sheet into the new sheet, as well as creating a pre-formatted sheet or template for entering data.

The various embodiments of the present invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings. While this Summary is provided to introduce a selection of concepts in a simplified form that are further described below, it is not intended to identify essential features of the claimed subject matter, nor is it intended to be used as an aid in determining the scope of the claimed subject matter.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
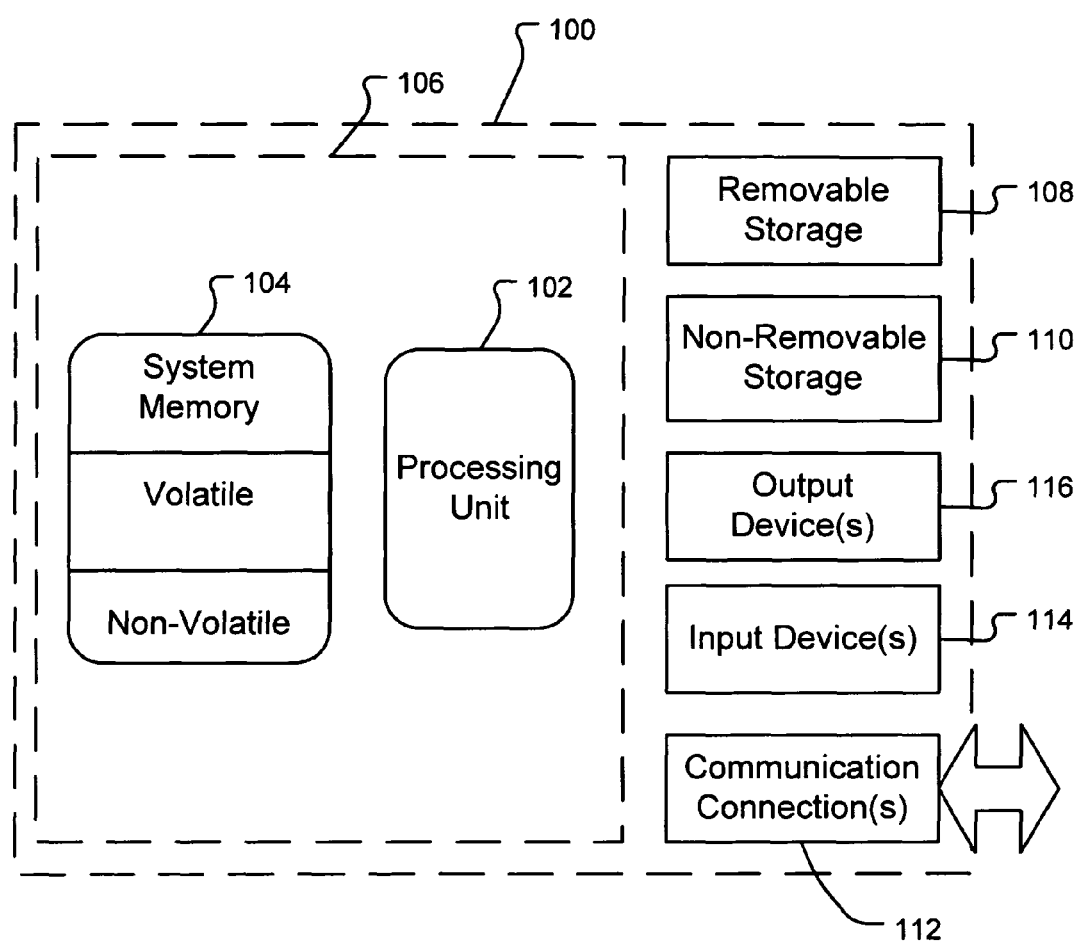
FIG. 1 illustrates an example of a suitable computing system environment on which an embodiment of the present invention may be implemented.

In general, the present invention relates to a graphical user interface that may be implemented on a computer system. FIG. 1 is provided to illustrate an example of a suitable computing system environment on which embodiments of the invention may be implemented. In its most basic configuration, computing system 100 includes at least one processing unit 102 and memory 104. Depending on the particular configuration and type of computing device, memory 104 may be volatile (such as RAM), non-volatile (such as ROM, flash memory, etc.) or some combination of the two. This type of basic configuration is illustrated in FIG. 1 by dashed line 106.

In addition to the memory 104, the system may include at least one or more other forms of computer readable media. Computer readable media can be any available media that can be accessed by the computing system 100. By way of example, and not limitation, computer readable media might comprise computer storage media and communication media.

Computer storage media includes volatile and nonvolatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing system 100. Any such computer storage media may be part of system 100.

Computing system 100 may also contain communications connection(s) 112 that allow the system to communicate with other devices. The communications connection(s) 112 exemplifies use of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Thus, as described above, "computer readable media" may include any available media that can be accessed by processing unit 102. In particular, computer readable media may comprise computer storage media, communication media, or any combination thereof.

In accordance with an embodiment, the computing system 100 includes peripheral devices, such as input device(s) 114 and/or output device(s) 116. Exemplary input devices 114 include, without limitation, keyboards, computer mice, pens, or styluses, voice input devices, tactile input devices and the like. Exemplary output device(s) 116 include, without limitation, devices such as displays, speakers, and printers. Each of these devices is well know in the art and, therefore, are not described in detail herein.

Figure 2:
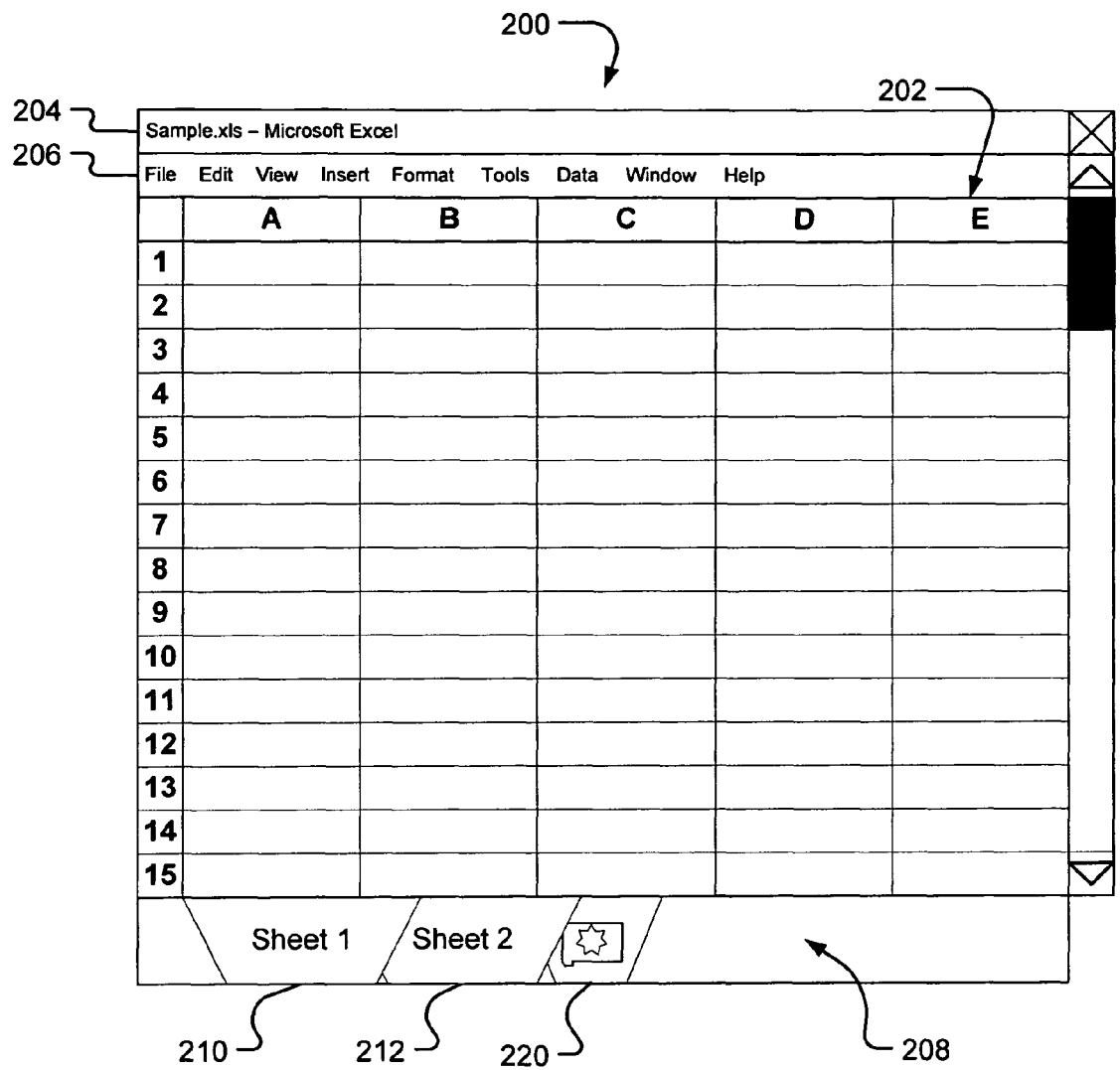
FIG. 2 illustrates an example of a spreadsheet program implementing the present invention within a sample spreadsheet workbook.

In one embodiment, a "new sheet" button allows users of spreadsheet software to quickly add a new sheet to a set of tabbed worksheets or "workbook." FIG. 2 illustrates an exemplary spreadsheet application 200 displaying a sample workbook 202. As may be appreciated, each worksheet within a spreadsheet workbook includes rows and columns of data cells. These elements are known in the art. The spreadsheet application 200 may also include other known user interface elements, such as a title bar 204 and a menu bar 206.

Spreadsheet workbooks typically contain more than one worksheet for ease of organization and use. Each worksheet in a workbook may operate as an independent spreadsheet or may be linked to values in other worksheets contained in the same or other workbooks. Typically, only one "active worksheet" is displayed at a time. The user may manipulate data only in the active worksheet, as inactive worksheets are hidden from view.

To allow the user to navigate between worksheets, spreadsheet applications typically display a worksheet tab region 208 in which a separate tab corresponds to each worksheet in the workbook. FIG. 2 illustrates a worksheet tab region 208 that is located along a bottom edge of the workbook 202, where the region 208 includes tabs 210 and 212 (organized from left to right) for two exemplary worksheets. In other embodiments, the worksheet tab region 208 may be organized right to left or may be located along the top edge of the workbook 202. In still other embodiments, the worksheet tab region 208 may be located along the side of the sheet and organized either top to bottom or bottom to top.

In the example shown in FIG. 2, a "new worksheet" button 220 is located at one end of the tab region 208 to the right of sheet tabs 210 and 212. Of course, in other embodiments, the new worksheet button 220 may be located to the left of the existing tabs 210 and 212 (or above/below the existing tabs when the tab region 208 is arranged vertically). As described in greater detail below with respect to FIG. 6, the new worksheet button 220 may include an icon identifying its function and, furthermore, the button 220 in an embodiment is shorter in length than a standard or minimum length of the sheet tabs 210 and 212. That is, the new worksheet button 220 is positioned adjacent the sheet tabs 210 and 212 to provide an intuitive control for adding new sheets within the workbook 202, but the button 220 in this embodiment is sized smaller than the tabs 210 and 212 to provide maximum room within the tab region 208 for additional sheet tabs.

Figure 3:
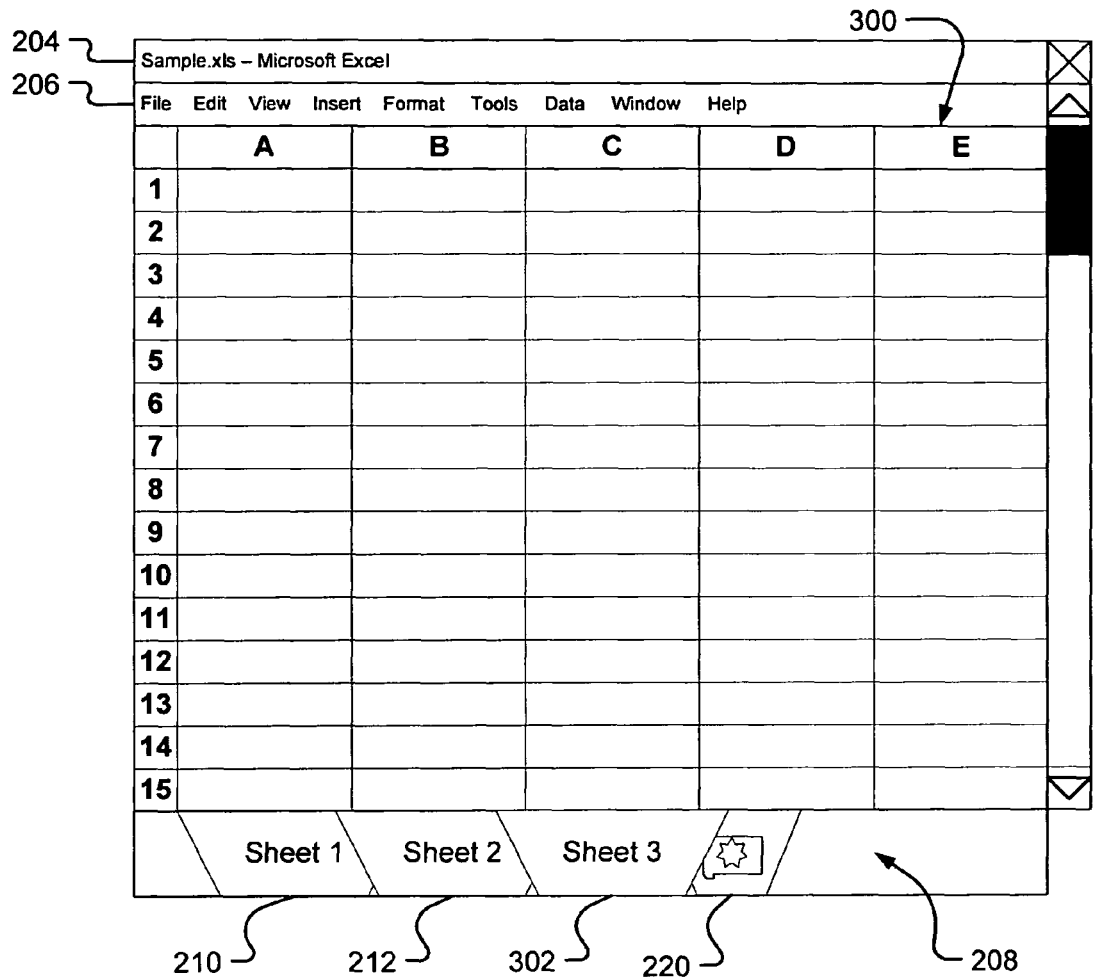
FIG. 3 illustrates the exemplary spreadsheet workbook of FIG. 2 after a new sheet has been added using the present invention.

FIG. 3 illustrates the exemplary workbook 202 shown in FIG. 2 after adding a new worksheet 300 using the dedicated new worksheet button 220. In embodiments, a left mouse click on new worksheet button 220 causes a new worksheet 300 to be added to the workbook 202. The new worksheet 300 includes a new tab 302 that, in one embodiment, is added to the left of the new worksheet button 220. This placement leaves the new worksheet tab 302 in a position close to the mouse cursor (after clicking the new worksheet button 220) so that the user may easily access the tab 302 in order to edit the label name of the worksheet 300 or move the worksheet 300 to another location in the workbook 202 (i.e., drag-and-drop the new worksheet tab 302 to a new position within the tab region 208). In alternative embodiments, wherein the spreadsheet program is oriented right-to-left for use with right-to-left languages (such as Japanese), the new worksheet button 220 is preferably positioned to the left of the existing worksheet tabs (e.g., tabs 210 and 212). Further still, the new worksheet tab may be added to an end of the tab region 208 opposite the new worksheet button 220 in order to clearly distinguish the new worksheet button from the newly added worksheet tab (i.e., the button 220 may be positioned at a front end of the region 208 while the new worksheet tab 302 is added to a rear end of the region 208).

In another embodiment, placement of the new worksheet tab 302 may be determined by the position of the active worksheet when the user selects the new worksheet button 220. For example, the new worksheet 300 may be added, by default, either immediately before or after the currently active worksheet. Thus, in one embodiment, if "Sheet 2" had been active in FIG. 3 when the user selected the new worksheet button 220, the new worksheet ("Sheet 3") would have been inserted between "Sheet 1" and "Sheet 2" (and thus the tab 302 would be positioned between tabs 210 and 212).

Regardless of whether the newly added worksheet is placed at the end of the list of existing sheets, or whether it is placed immediately before (or after) the active worksheet, an embodiment prevents the tab for the new worksheet (e.g., the tab 302) from being added on the opposite side of the new worksheet button 220. This avoids confusion that may occur if the new worksheet button 220 is positioned between the worksheet tabs. Furthermore, in an embodiment, the user is not allowed to move the newly added tab to the opposite side of the button 220. Thus, in the example shown in FIG. 3, the newly added tab 302 is positioned by default to the left of the new worksheet button 220, and the user is not permitted to move the new tab 302 to the right of the button 220.

New worksheet 300 is preferably named according to the standard naming convention followed by the spreadsheet program 200, and a label bearing this name is included in the tab 302 for the new worksheet 300. By way of example, and not of limitation, the new worksheet may be named "Sheet n", where "n−1" represents the number of pre-existing worksheets contained within the workbook 202. In the example shown in FIG. 3, where there are already two pre-existing worksheets (210 and 212) in the workbook 202, the new worksheet 300 is given the default name of "Sheet 3" (i.e., n−1=2, and thus n=3). In other embodiments, the naming convention could be modified to recognize patterns in existing worksheet names, such as a sequence of numbers or dates, so that added worksheets are named according to the pattern.

Figure 4:
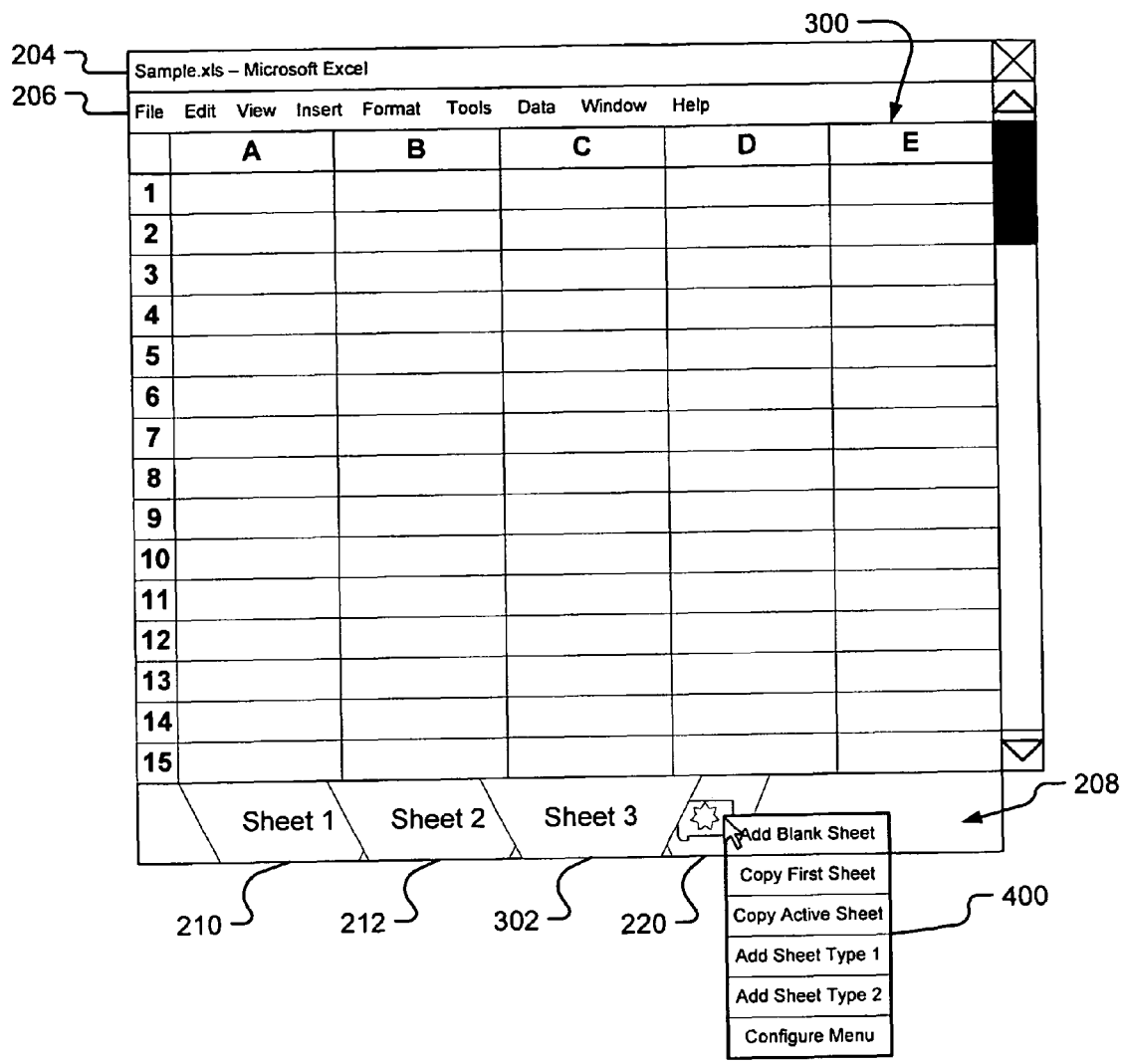
FIG. 4 illustrates an embodiment of the present invention wherein a right mouse click on a new sheet button displays a pop-up menu with a plurality of options for adding different types of sheets.

FIG. 4 illustrates an aspect of a particular embodiment of the present invention in which a pop-up menu 400 appears when the user right-clicks the new worksheet button 220 (or selects another non-default button on a mouse or other pointing device). The pop-up menu 400 offers a plurality of alternatives for adding a new sheet to the workbook 202. By way of example, and not of limitation, the user may choose to copy the first or last worksheet in the workbook, copy the active worksheet, add a default blank worksheet, or choose to add a worksheet of a specific type or format. The pop-up menu options may be particularly useful in those cases where a user wishes to quickly copy, and then edit, the data contained within an existing worksheet.

In an embodiment of the present invention, the user may configure the pop-up menu 400 to provide options for adding specific worksheet templates. This may be beneficial for those users that are frequently required to add one or more standard, formatted worksheets to existing workbooks. An added benefit of the new sheet button 220 is that the pop-up menu 400 is not context sensitive. That is, certain menu items within the menu 400 do not rely or depend on an active worksheet and/or its format. Instead, the menu 400 provides an independent set of menu items defining certain sheet types or blank sheets.

Figure 5:
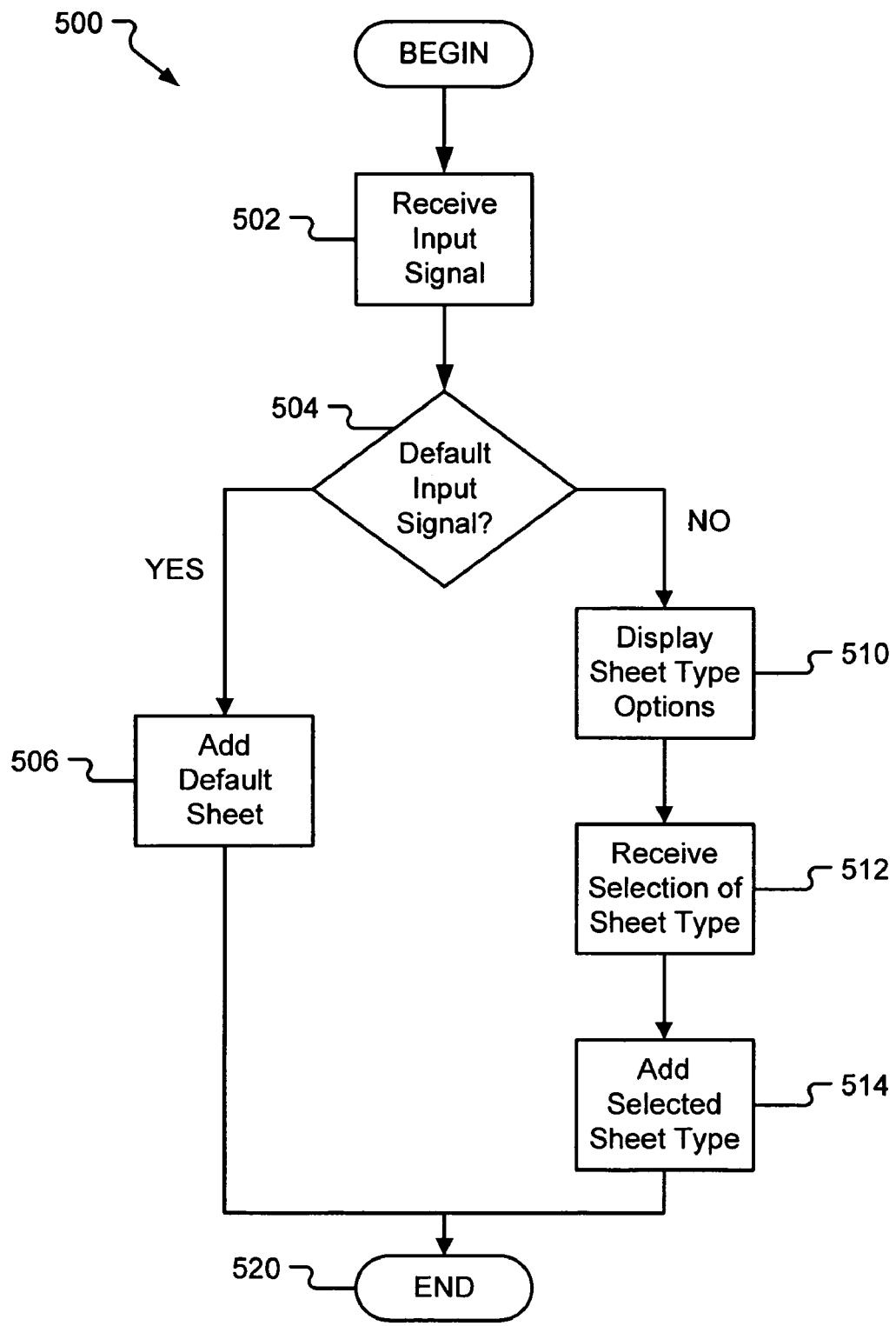
FIG. 5 is a flow diagram illustrating operational characteristics of a process for adding a tabbed sheet to a workbook in accordance with one embodiment of the present invention.

FIG. 5 illustrates, in flow diagram form, a process 500 for adding a new sheet to an existing set of tabbed sheets (e.g., a new worksheet within a spreadsheet workbook), in accordance with an embodiment of the present invention. Initially, the process 500 starts with receive operation 502 receiving an input signal from the user selecting the new sheet button (e.g., the new worksheet button 220). Typically, the receive operation 502 comprises receiving a mouse click signal when the mouse cursor is positioned over the new sheet button. However, alternative input signals may also be received, such as by pressing a touchpad or a touch-sensitive display screen, or by pressing a key on a keyboard, as well as numerous other types of input signals that are known to those skilled in the art. Next, determination 504 determines whether the input signal is a default input signal. In an embodiment of the present invention, the default signal comprises clicking a left mouse button (although other default signals may include single tapping a touch screen, among others). If the default signal is detected, the operational flow branches YES to add operation 506.

Add operation 506 adds a new default sheet to the set of tabbed sheets. In an embodiment where the set of tabbed sheets comprises a spreadsheet workbook, add operation 506 adds a default worksheet to the workbook. As described above, the location of the new sheet may be at the end of the workbook, or either in front of or behind the active sheet (among other options). The addition of a "default" sheet refers to a sheet having a predetermined set of formatting rules, such as the blank worksheet 300 shown in FIG. 3. In other embodiments, the "default" worksheet may incorporate predetermined formatting, or may simply copy the formatting from other worksheets in the workbook. Similarly, when used with collections of tabbed sheets other than a spreadsheet workbook, the default sheet formatting may include a default style (i.e., set of formatting commands) or a default set of contents or data entry fields.

If determination 504 concludes that the input signal received during receive operation 502 is a non-default signal, such as a right mouse click or a double tap on a touch screen, then flow branches NO to display operation 510. Display operation 510 displays a pop-up menu with a plurality of sheet types from which the user may select to add to the set of tabbed sheets. These sheet types provide for including various contents or formatting within the new sheet, including a blank sheet having no content or formatting. By way of example, and not of limitation, these options may include inserting a default sheet type, copying the active sheet, copying the first or last sheet in the set, or inserting a sheet having the same type or format as another sheet in the set, in addition to other options that will be readily apparent to those skilled in the art.

In an embodiment of the present invention where the set of tabbed sheets comprises a spreadsheet workbook, the pop-up menu 400 may include options for adding different types of worksheets (i.e., worksheets having a predetermined format or containing predefined contents or data fields), as well as copying existing worksheets within the workbook (such as the active worksheet). In a further embodiment, the pop-up menu also includes an option to configure the pop-up menu, thus allowing the user to determine what sheet types may be added via the pop-up menu. In one embodiment, a "configure menu" option within the menu 400 provides access to a conventional menu configuration dialog (not shown).

Following display operation 510, flow continues to receive operation 512, which receives the user's selection of a sheet type. Next, add operation 514 adds a new sheet to the set of tabbed sheets, wherein the new sheet is of a type selected in receive operation 512. In one embodiment, the new tab-based sheet comprises a spreadsheet worksheet that is added to a workbook in accordance with the above teachings.

Following the addition of a "default" sheet in operation 506, or the addition of a selected type of sheet in operation 514, the process 500 ends at operation 520.

As described above, embodiments of the present invention preferably utilize a new worksheet button 220 that resembles a smaller version of the tabs used to delineate worksheets 210 and 212 in a spreadsheet workbook 202. However, it is understood that the present invention is not limited to spreadsheet workbooks, and that the appearance of the new sheet button may vary depending on the appearance of the tabs used with the set of tabbed sheets. In embodiments, the new sheet button is preferably sized to resemble a smaller version of the tabs used to identify the separate tabbed sheets. The smaller size is possible because the tabs associated with each sheet typically include a text label to help identify the different sheets, while the new sheet button may include a recognizable icon in lieu of a text label. Furthermore, by sizing the new sheet button smaller than the remaining tabs, the new sheet button will not crowd or take up an unnecessary amount of space within the tab region 208. That said however, the new sheet button 220 should be large enough to be recognizable and easily selectable.

Figure 6:
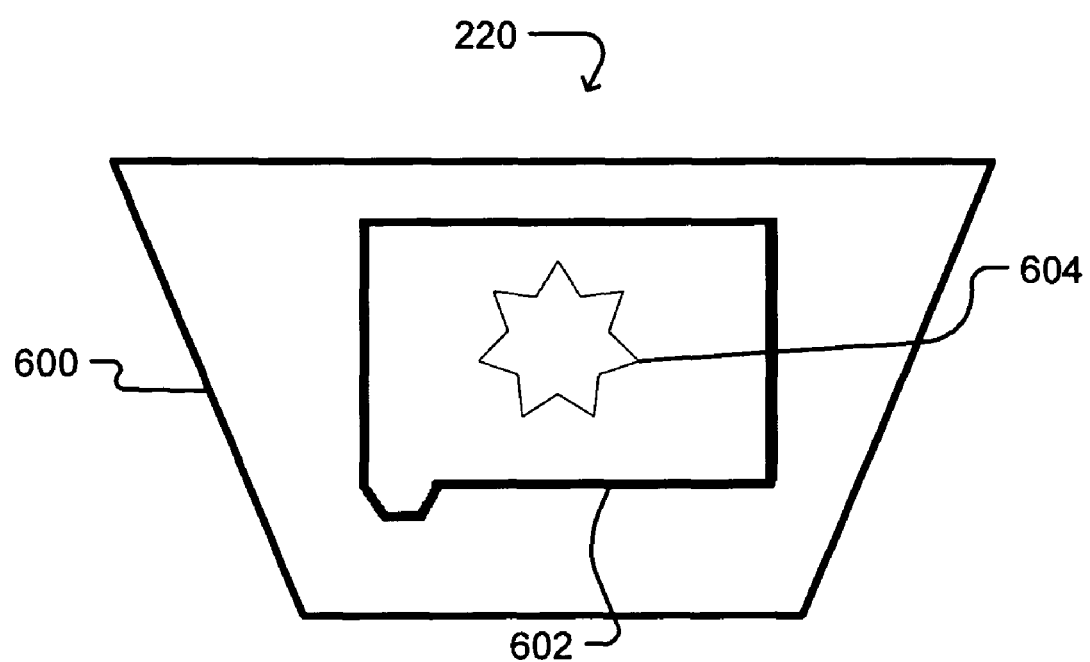
FIG. 6 illustrates elements of a new sheet button in accordance with one embodiment of the present invention.

FIG. 6 illustrates an enlarged version of one embodiment of the new sheet button 220 of the present invention. In particular, the new sheet button 220 is used with a spreadsheet workbook 202 (FIG. 2) and comprises a tab 600 having an icon 602. In one embodiment, the tab 600 is approximately one half the standard or minimal width of sheet tabs 210 and 212 in FIG. 2. That is, while the sheet tabs 210 and 212 may expand to accommodate relatively long text labels, the sheet tabs typically have a nominal or minimum length to ensure the visibility of the tab within the workbook. Thus, in one embodiment, the new sheet button 220 has an overall length that is less than (and in one embodiment approximately half) the minimum length of the sheet tabs 210 and 212.

In other embodiments, the tab 600 is preferably of a different color than sheet tabs 210 and 212. Additionally, icon 602 preferably comprises a representation of a tabbed sheet with a star 604 or other feature to indicate to the user that the function of the button 220 is to create a new tabbed worksheet. However, the present invention is not limited to the embodiment of the new sheet button 220 shown in FIG. 6. Indeed, any shape or design of the button 220 may be used, provided that the button serves to identify the function of creating a new tabbed sheet.

Although the present invention has been described in language specific to structural features, methodological acts, and computer readable media containing such acts, it is to be understood that the present invention defined in the appended claims is not necessarily limited to the specific structure, acts, or media described. Rather, the specific features and acts described above are disclosed as example forms of implementing the claims, and one skilled in the art will recognize other embodiments or improvements that are within the scope and spirit of the present invention.

For example, while an embodiment of the present invention present invention has been described with respect to tabbed worksheets in a spreadsheet workbook, it should be appreciated that the present invention is applicable to any collection of tabbed documents where a user may desire to add a new tabbed sheet in a quick and convenient manner. Furthermore, the precise location, size and configuration of the new worksheet button is not limited by the above description, and one skilled in the art may alter the location and format of the button, provided that the button remains associated with the very tabs used to identify the different sheets (such as being positioned within the tab region 208), as opposed to being located within a separate menu that is distinct from the identifying tabs. Additionally, the computing system 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems, and the like.

What is claimed is:

1. A computer storage medium having computer-executable instructions for performing a method for adding a new worksheet to a spreadsheet workbook, wherein each worksheet includes a worksheet tab having a text label identifying the worksheet, and wherein a user may select the worksheet tab to designate the corresponding worksheet as an active worksheet, and wherein each worksheet tab has a minimum length dimension for displaying the text label, and wherein each worksheet tab is aligned within a worksheet tab region along an edge of spreadsheet workbook; the method comprising:

displaying a new worksheet button having an icon label, wherein the new worksheet button is adjacent to one of the worksheet tabs corresponding to a worksheet within the spreadsheet workbook, wherein the new worksheet button is not associated with a worksheet in the spreadsheet workbook, and wherein the new worksheet button is automatically configured to have a length dimension that is shorter than the minimum length dimension, and wherein the new worksheet button is positioned at an end of the worksheet tab region adjacent a last worksheet tab and the user is prevented from adding a worksheet tab adjacent to at least one side of the new worksheet button;

receiving a first input signal indicating user selection of the new worksheet button;

determining whether the first input signal is one of a default input signal and a non-default input signal;

when the first input signal is a default input signal, automatically adding a default worksheet as the new worksheet to the spreadsheet workbook, the new default worksheet having a new worksheet tab; and when the first input signal is a non-default input signal, the method further comprising:

generating a menu displaying a plurality of options for creating the new worksheet, wherein the plurality of options comprises an option to copy and add an active worksheet and an option to add a user-defined worksheet;

receiving a second input signal indicating user selection of one of the plurality of options; and adding the new worksheet to the spreadsheet workbook based on the second input signal, the new worksheet having a new worksheet tab.

2. The computer storage medium as defined in claim 1, wherein:

the worksheet tabs are aligned horizontally within the worksheet tab region; and the new worksheet button is positioned at a right end of the worksheet tab region.

3. The computer storage medium as defined in claim 1, wherein the new worksheet tab is positioned between the last worksheet tab and the new worksheet button.

4. The computer storage medium as defined in claim 3, wherein the new worksheet tab is positioned before the active worksheet tab so that the active worksheet tab is positioned between the new worksheet tab and the new worksheet button.

5. The computer storage medium as defined in claim 3, wherein the new worksheet tab is positioned after the active worksheet tab so that the new worksheet tab is positioned between the active worksheet tab and the new worksheet button.

6. The computer storage medium as defined in claim 5, wherein the new worksheet button includes an icon identifying the function of the new worksheet button.

7. A computer-implemented method for adding a new worksheet to a set of worksheets, wherein each worksheet includes a worksheet tab having a label identifying the worksheet, the method comprising:

displaying the set of worksheet tabs, each worksheet tab having a text label identifying the worksheet, wherein each worksheet tab has a minimum length dimension for displaying the text label, and wherein each worksheet tab is aligned within a worksheet tab region along an edge of the set of worksheets;

displaying a new worksheet button having an icon label, the new worksheet button adjacent to one of the worksheet tabs corresponding to a worksheet within the set of worksheets, wherein the new worksheet button does not correspond to a worksheet in the set of worksheets, and wherein the new worksheet button is automatically configured to have a length dimension that is shorter than the minimum length dimension, and wherein the new worksheet button is positioned at an end of the worksheet tab region adjacent a last worksheet tab and the user is prevented from adding a worksheet tab adjacent to at least one side of the new worksheet button;

receiving a first input signal indicating user selection of the new worksheet button;

determining whether the first input signal is one of a default input signal and a non-default input signal;

when the first input signal is a default input signal, automatically adding a default worksheet as the new worksheet to the spreadsheet workbook, the new default worksheet having a new worksheet tab; and when the first input signal is a non-default input signal, the method further comprising:

generating a menu displaying a plurality of options for creating the new worksheet, wherein the plurality of options comprises:

an option to copy an active worksheet; and an option to add one of a plurality of user-defined worksheet types;

receiving a second input signal indicating user selection of a menu option;

adding a new worksheet to the set of worksheets based on the second input signal, wherein at least one of the new worksheets' format and content is determined by the selected menu option.

8. A computer storage medium having computer-executable instructions for performing a method for adding a new worksheet to a spreadsheet workbook, wherein each worksheet includes a tab having a label identifying the worksheet, and wherein a user may select the tab to designate the corresponding worksheet as an active worksheet, the method comprising:

generating a customized menu for adding new worksheets to the spreadsheet workbook, each worksheet having a text label identifying the worksheet and wherein each worksheet tab is aligned within a worksheet tab region along an edge of the workbook;

receiving a first input signal indicating user selection of a configure menu option;

receiving user indication of one or more worksheet types to be displayed in the customized menu; and storing the user indications of the one or more worksheet types as user-selected options for display in the customized menu;

displaying a new worksheet button having an icon label, the new worksheet button adjacent to one of the worksheet tabs corresponding to a worksheet within the spreadsheet workbook, wherein the new worksheet button does not correspond to a worksheet in the spreadsheet workbook, and wherein the new worksheet button is automatically configured to have a length dimension that is shorter than a minimum length dimension, and wherein the new worksheet button is positioned at an end of the worksheet tab region adjacent a last worksheet tab and the user is prevented from adding a worksheet tab adjacent at least one side of the new worksheet button;

receiving a second input signal indicating user selection of the new worksheet button;

determining whether the second input signal is one of a default input signal and a nondefault input signal;

when the second input signal is a default input signal, automatically adding a default worksheet as the new worksheet to the spreadsheet workbook, the new default worksheet having a new worksheet tab; and when the second input signal is a non-default input signal, the method further comprising:

generating the customized menu displaying user-selected options for creating the new worksheet;

receiving a third input signal indicating user selection of one of the customized user-selected options; and adding a new worksheet having a new worksheet tab to the spreadsheet workbook based on the third input signal, wherein the new worksheet is of a user-defined worksheet type.

9. The computer storage medium as defined in claim 8, wherein the new worksheet tab is positioned between the new worksheet button and the last worksheet tab.

10. The computer storage medium as defined in claim 8, wherein the new worksheet tab is positioned at an end of the worksheet tab region opposite the new worksheet button.

11. The computer storage medium as defined in claim 8, wherein the method further comprises:

designating one worksheet within the spreadsheet workbook as an active worksheet, wherein the active worksheet includes an active worksheet tab; and positioning the new worksheet tab immediately adjacent the active worksheet tab in the worksheet tab region.

\* \* \* \* \*